(12) United States Patent
Zaremba, Jr.

(10) Patent No.: US 6,216,164 B1
(45) Date of Patent: Apr. 10, 2001

(54) COMPUTERIZED SYSTEM AND METHOD FOR MANAGING INFORMATION

(75) Inventor: Edward P. Zaremba, Jr., Tallahassee, FL (US)

(73) Assignee: Florida State University, Tallahassee, FL (US)

( * ) Notice: Subject to any disclaimer, the term of this patent is extended or adjusted under 35 U.S.C. 154(b) by 0 days.

(21) Appl. No.: 09/359,500

(22) Filed: Jul. 23, 1999

Related U.S. Application Data

(60) Provisional application No. 60/108,737, filed on Nov. 17, 1998.

(51) Int. Cl.[7] .................................................. G06F 13/00
(52) U.S. Cl. ............................................. 709/227; 709/223
(58) Field of Search ................................. 709/203, 217, 709/218, 219, 227, 223; 707/10

(56) References Cited

U.S. PATENT DOCUMENTS

| | | | |
|---|---|---|---|
| 5,754,830 | 5/1998 | Butts et al. ........................... | 709/311 |
| 5,931,913 | * 8/1999 | Meriwether et al. ................ | 709/227 |
| 5,958,013 | * 9/1999 | King et al. ........................... | 709/227 |

* cited by examiner

Primary Examiner—Kenneth R. Coulter
(74) Attorney, Agent, or Firm—Senniger, Powers, Leavitt & Roedel

(57) ABSTRACT

A system and method for managing data stored in a database. A mainframe computer associated with the database is operable to execute customer information control system (CICS) transactions that control an application program for processing the stored data. An open socket command from a remote computer enables CICS sockets at the mainframe for connecting the mainframe and the remote computer via a web server. The remote computer communicates on a global network using a client-server communications protocol and the CICS sockets permit the remote computer to communicate with the mainframe by the client-server communications protocol. Following the open socket command, the CICS transactions are executable by the remote computer for controlling the application program at the mainframe. In another form, the system and method extract selected academic registration data from the database for generating a course audit report.

40 Claims, 4 Drawing Sheets

Microfiche Appendix Included
(4 Microfiche, 189 Pages)

COMPUTERIZED SYSTEM AND METHOD FOR MANAGING INFORMATION

CROSS REFERENCE TO RELATED APPLICATION

This application claims the benefit of U.S. provisional application Ser. No. 60/108,737, filed Nov. 17, 1998, the entire disclosure of which is incorporated herein by reference.

MICROFICHE APPENDIX

This application includes a microfiche appendix having four microfiches and 189 frames.

NOTICE

Copyright © 1999 Florida State University. A portion of the disclosure of the patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates generally to information management and, particularly, to an interactive information management system that provides integration between a mainframe computer and an interactive wide area network, such as the Internet.

Although the use of personal computers is becoming increasingly widespread, mainframe computers still store and manage the vast majority of data relied upon by businesses and institutions for their critical operations. For example, a university system will often use a mainframe to house the academic registration data for tens of thousands of students. Database management in a clearinghouse environment such as this often involves the execution of complex software routines by the mainframe computer to control the organization, storage and retrieval of data in a database. With the increasing popularity of the wide area, or global, network commonly referred to as the Internet, many users desire access to information housed in a mainframe via the Internet. Unfortunately, mainframes are typically associated with batch processing rather than interactive use and are not easily integrated with the Internet. In other words, conventional systems are unable to provide a mainframe host on-line.

Those skilled in the art recognize "3270" as a class of terminals, or display devices, for communicating with a mainframe. Customer information control system (CICS) applications written for 3270 input and output provide relatively clean, fast and easy-to-create application front ends for data processing by mainframe computers. Unfortunately, a communications monitor such as CICS generally cannot be extended to the Internet because its transactions are "closed" and only available through a 3270 terminal. A 3270 emulation package, which simulates a dummy terminal connected to the mainframe, usually makes the connections. For example, TN3270 refers to a 3270 terminal emulator program used to connect IBM mainframe computer hosts over a network. The user logs in with a name/password and sends a series of menu-driven commands taking the session to the desired location for data viewing. Since the Internet is completely stateless, this continuous connection is a problem with using conventional CICS and 3270 sessions to provide data access via the Internet.

U.S. Pat. No. 5,754,830, the entire disclosure of which is incorporated herein by reference, discloses a server and web browser terminal emulator but requires a persistent connection to a legacy host system. The computer network environment disclosed by this patent uses an application within an application, namely, an applet, which is still a 3270 session within a browse.

For these reasons, a database management system is desired for integrating a mainframe computer with the Internet to provide fast and efficient on-line access to the information stored in the mainframe's database, as well as creating a common gateway interface (CGI) to the mainframe's CICS area.

SUMMARY OF THE INVENTION

The invention meets the above needs and overcomes the deficiencies of the prior art by providing an improved data management system and method that provides integration between a mainframe computer and an interactive wide area network, such as the Internet. Among the several objects and features of the present invention may be noted the provision of such system and method that permit integration between a mainframe and an interactive wide area network; the provision of such system and method that permit a mainframe to be accessed by personal computer users via a user friendly interface; the provision of such system and method that permit an on-line mainframe host; the provision of such system and method that extend CICS applications to an interactive wide area network; the provision of such system and method that facilitate student advising based on information stored in a mainframe database; and the provision of such system and method that are economically feasible and commercially practical.

Briefly described, a data management system embodying aspects of the invention includes a web server for accessing sites on a global network and a remote computer connected to the global network via the web server. The remote computer communicates on the global network using a client-server communications protocol. The system also includes a database storing data and a mainframe computer associated with the database. The mainframe is operable to execute CICS transactions that control an application program for processing the stored data. The mainframe receives an open socket command from the remote computer via the web server and responds by enabling CICS sockets. In turn, the CICS sockets permit the remote computer to communicate with the mainframe by the client-server communications protocol so that the CICS transactions are executed by the remote computer for controlling the application program at the mainframe.

Another embodiment of the invention is directed to a method of managing data stored in a database. A mainframe computer associated with the database is operable to execute CICS transactions that control an application program for processing the stored data. The method includes the steps of generating an open socket command with a remote computer and receiving the command at the mainframe. The remote computer is connected to a global network via a web server for accessing sites on the global network and communicates on the global network using a client-server communications protocol. The mainframe and remote computer are connected via the web server. The method also includes enabling CICS sockets in response to the open socket command from the remote computer. The CICS sockets permit the remote computer to communicate with the mainframe by the client-server communications protocol. The method further includes the step of executing the CICS transactions by the remote computer for controlling the application program at the mainframe.

In another form, a method of extracting selected academic registration data from a database embodies aspects of the invention. The method includes generating an open socket command with a remote computer, receiving the command at a mainframe computer and connecting the mainframe and the remote computer via a web server in response to the command. The remote computer is connected to a global network via the web server for accessing sites on the global network and the mainframe is associated with the database. The method also includes the step of defining a rules list. The academic registration data stored in the database includes an inventory of courses completed by one or more students and the rules list includes information representative of required courses and prerequisites for courses in an academic degree program. The method further includes mapping the courses of a selected student as objects, comparing the mapped course objects to the rules lists and generating an audit report based on the comparison.

In yet another form, a method of extracting data from a database embodies aspects of the invention. The data stored in the database includes an inventory of items for use in a clearinghouse environment. The method includes generating an open socket command with a remote computer, receiving the command at a mainframe computer and connecting the mainframe and the remote computer via a web server in response to the command. The remote computer is connected to a global network via the web server for accessing sites on the global network and the mainframe is associated with the database. The method also includes the step of defining a rules list that includes information representative of required items and prerequisites for completion in the clearinghouse environment. The method further includes mapping the selected items as objects, comparing the mapped objects to the rules lists and generating an audit report based on the comparison.

Alternatively, the invention may comprise various other methods and systems.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
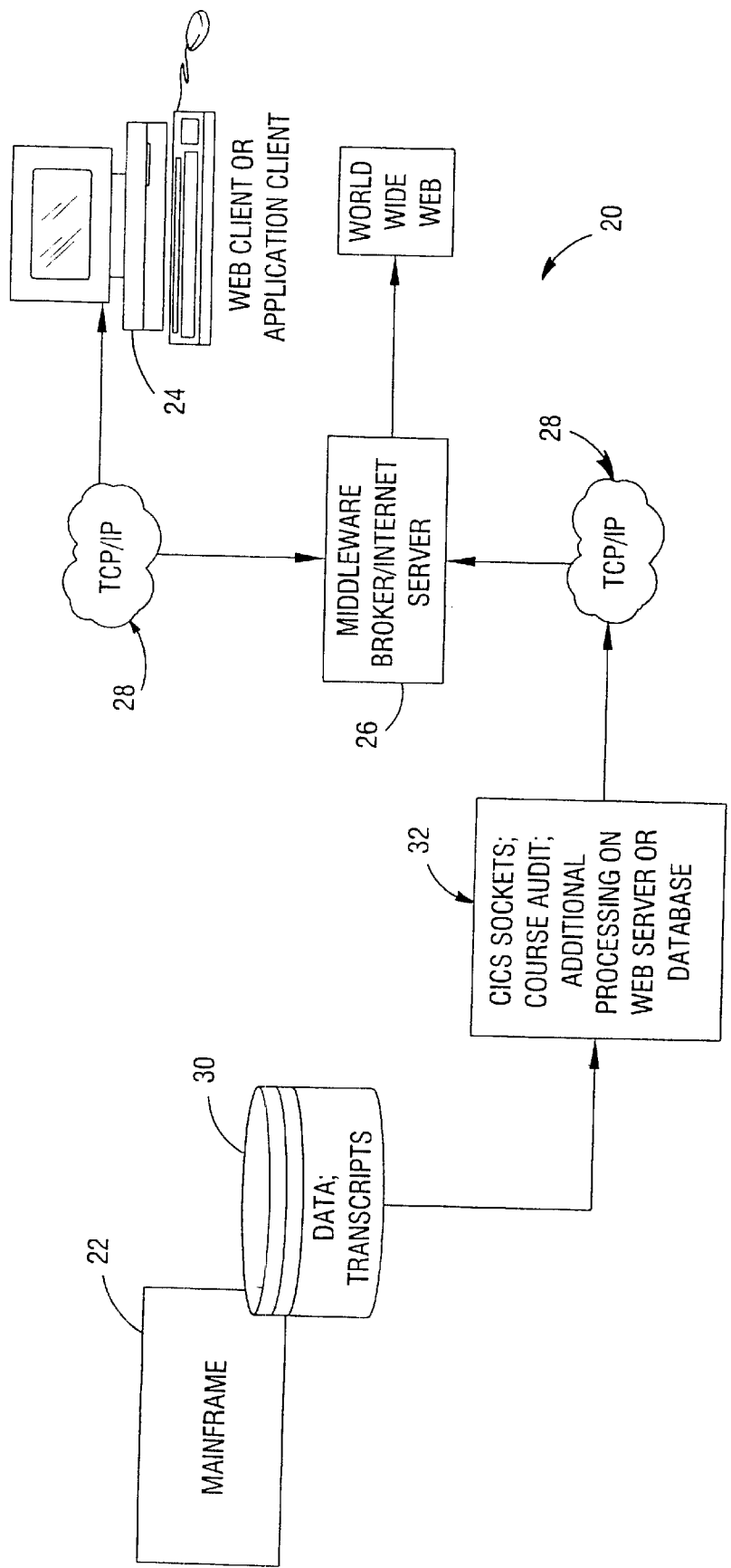
FIG. 1 is a block diagram of a data management system according to a preferred embodiment of the invention.

Referring now to FIG. 1, an information management system embodying aspects of the invention, generally indicated at 20, provides on-line access to a mainframe computer 22 from a personal computer 24. In general, connections to the wide area network known as the Internet provide computer users with access to a number of resources, including documents on the World Wide Web, a hypertext-based information service that allows web browser clients to access information from web servers. With an Internet connection via a web server 26, and using specific web browser software, a user can browse the World Wide Web. Examples of such software include Netscape Navigator® and Microsoft Internet Explorer™. A suite of protocols, referred to as TCP/IP and indicated generally at 28, provides a standardized format for Internet data communication between, for example, a server and client. The TCP/IP protocol suite 28 is named for its two main protocols, i.e., the transmission control protocol (TCP) and the Internet protocol (IP). As is known in the art, web documents, or pages, are usually made up of multiple objects such as blocks of text, images, programs, audio clips and/or video clips. A hypertext transfer protocol (HTTP) provides for the transport of bitstreams representing these objects from a remote server to a local client and is the primary mode of transfer and presentation in a stateless connection environment, unlike a truly persistent 3270 session.

In a preferred embodiment of the present invention, mainframe 22 (e.g., an IBM S/390 machine) includes a database 30 inventory data in a clearinghouse environment. For example, the database 30 stores academic registration data, such as transcripts, of students in a university system. The database management system 20 preferably provides several functions, indicated generally at 32, for integrating mainframe 22 with the Internet to provide fast and efficient on-line access to the information stored in database 30. System 20 accomplishes this task without re-engineering the software executed by mainframe 22 to control the organization, storage and retrieval of data in database 30. Rather, system 22 implements the functions shown in block 32 to run a 3270 session in the background (i.e., at mainframe 22) while a user receives a hypertext markup language (HTML) version of the 3270 session at computer 24. This permits mainframe 22 to deliver data, and computer 24 to access the delivered data, with relatively simple remote procedure calls or execute commands combined with boolean expression built with exceptions and conditions. The IP address and connection statistics are held in a database to continue the connection with the user.

As will be described in detail below, one of the functions illustrated by block 32 enables CICS sockets for opening the CICS mainframe 22 to the protocols of the Internet (i.e., TCP/IP 28). By making the programs that run under the CICS transaction system available over TCP/IP 28, any other device that can communicate by this protocol is able to call and execute CICS transactions, including applications connected to the Internet. Differentiating itself from a 3270 session, this process eliminates the need for application middleware otherwise necessary to format the 3270/CICS sessions into HTML or other presentation data. Thus, the CICS enabler program allows mainframe 22 to function similarly to a web server, which accepts an incoming request and simply calls the specific program that handles the request (i.e., a CGI web application). The CICS enabler accomplishes its function by creating a socket and passing information through the virtual connection. Mainframe 22 then creates a child server that calls the CICS program or other executable, extracts the data, formats it to HTML or other Internet standard and sends it back to the client computer 24 through the socket. Although this is similar in nature to a CGI request used in making a web site, it is accomplished on mainframe 22 rather than the HTTP server 26. An interactive web page presents a "button," for example, that the user presses to retrieve information. The web page then runs a program to present the information in HTML format. Operating systems such as Windows NT and Unix are able to perform HTML formatting for web pages, but it is virtually impossible with conventional CICS and other mainframe sessions. In this manner, system 20 combines mainframe computing with client/server computing to exploit the networking features of databases and objects to provide a Windows interface or a web interface for accessing information from a variety of sources.

As shown in FIG. 1, system 20 also implements a course auditing system at block 32. In this embodiment, the audit program targets the needs of faculty, advisors, students, parents and others associated with universities, colleges and other learning institutions. A list of courses taken by a particular student is reformatted into an object oriented model where courses and majors contain properties and methods. The processing occurs when the transcript information retrieved from database 30 is "run" against the student's major. The result shows what courses are still required by the student to fulfill the requirements for a degree in his or her major. Although described with respect to a academic degree program, it is contemplated that the present invention is applicable to inventory data management in a number of clearinghouse environments.

Advantageously, the present invention implements the software products of block 32 in an object linking and embedding custom control that can be imported into Visual Basic, Visual C++, Borland C++, Delphi, or any development studio capable of handling Dynamic Link Libraries, OCX's or VBX's. Further, the program can be ported to ActiveX and Java.

Figure 2:
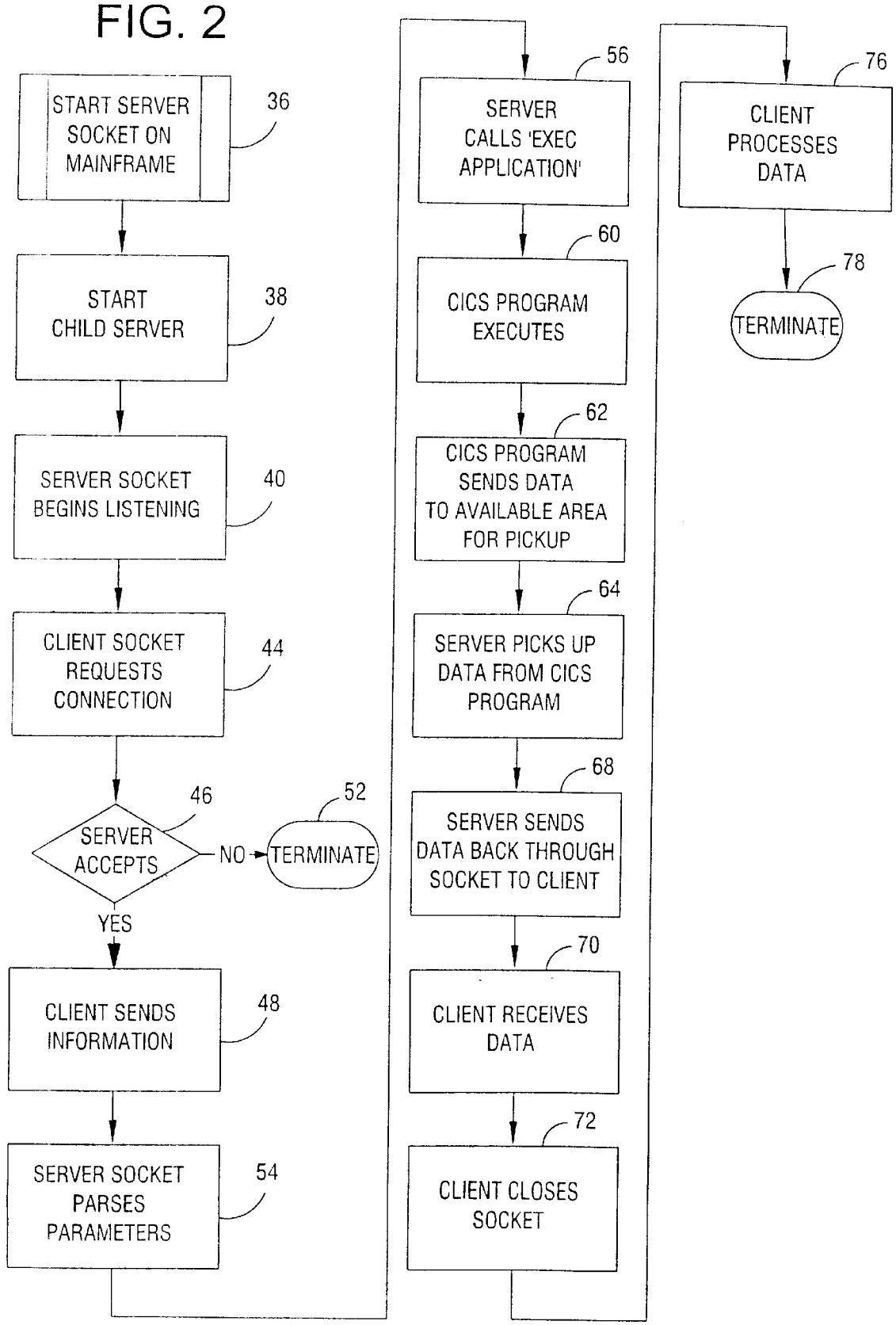
FIG. 2 is an exemplary flow diagram illustrating operation of the mainframe and remote computers of FIG. 1 for enabling CICS sockets.

Referring now to FIG. 2, a flow diagram illustrates the CICS enabler function of block 32. In general, the computer 24 of system 20 logs on to web server 26 and requests a report to be executed and delivered back to computer 24. Web server 26 then creates a client socket (on computer 24) to the server socket (on mainframe 22). Beginning at step 36, an open socket server command starts the server socket, which is now waiting for clients to connect. In order to make a connection over the Internet, a server socket must be available and running on mainframe 22 at a specific IP port and IP address. Upon connection of a client (either through web server 26 or as a second tier client), mainframe 22 creates a child server at step 38. This child server is relatively basic in its design (i.e., it follows the procedure for CICS sockets). The server socket "listens" for clients at step 40 to connect and pass information to the server.

The client socket opens a communication channel to the server socket with the correct IP address and port and, at step 44, requests a connection to mainframe 22. This brings mainframe 22 closer to the client/server model without sacrificing the central processing power of mainframe 22. At step 46, the server (i.e., mainframe 22) responds with a connection (if valid) and, at step 48, the client (i.e., computer 24) sends parameters to the server representing the mainframe program to execute. Otherwise, the session terminates at step 52.

Proceeding to step 54, the server socket parses the parameters sent by the client and then calls the requested executable (i.e., an EXEC command) at step 56. In other words, the server at mainframe 22 processes the information and calls the program requested in the parameters field of the parsed string of information sent by the client. After the CICS program executes at step 60, it sends data at step 62 to an available "comm" area to be picked up. At step 64, the server picks up the data, which is then sent back through the server socket to the client at step 68. The server sends the data to a client socket on web server 26 for HTML tags or directly to the client at computer 24 with tags already attached. At step 68, the server at mainframe 22 returns the information back through the port to the client at computer 24, which in turn receives the data at step 70. In this manner, system 20 provides a single point of communication via web server 26, which improves security and permits a firewall to be constructed to protect mainframe 22.

The computer 24 closes the client socket at step 72 after the server at mainframe 22 responds and sends the application information. At step 76, the client begins processing the data for either a web browser, software application or data transfer and conversion and then terminates at step 78. In the meantime, the server socket waits for another client connection. Preferably, simultaneous client connections are handled asynchronously by mainframe 22 in the CICS sockets region.

In one embodiment, system 20 provides a 3270 terminal emulation program that allows sessions to be recorded in a script for later use in a screen scraping process. In general, a screen scraper is a software tool used to automate interaction between two computer systems through the terminal interface of one of those systems. Typically, the screen scraper interacts with terminal emulation software to generate input to and process output from the "host" system through terminal screens. In this instance, a screen scraper is particularly useful because modifications to the host system (i.e., mainframe 22) are undesirable. As web users log into system 20, a 3270 session is started and recorded in a database. After each transaction, the service can be ended or each program can be executed to hold the session until the user logs off. Advantageously, this eliminates the need to change anything on mainframe 22. Rather, an NT server, for example, can run the software and all transactions are available with full security and functionality. This function is particularly useful for mainframes other than a CICS mainframe (e.g., a mainframe with a systems network architecture gateway).

Figure 3:
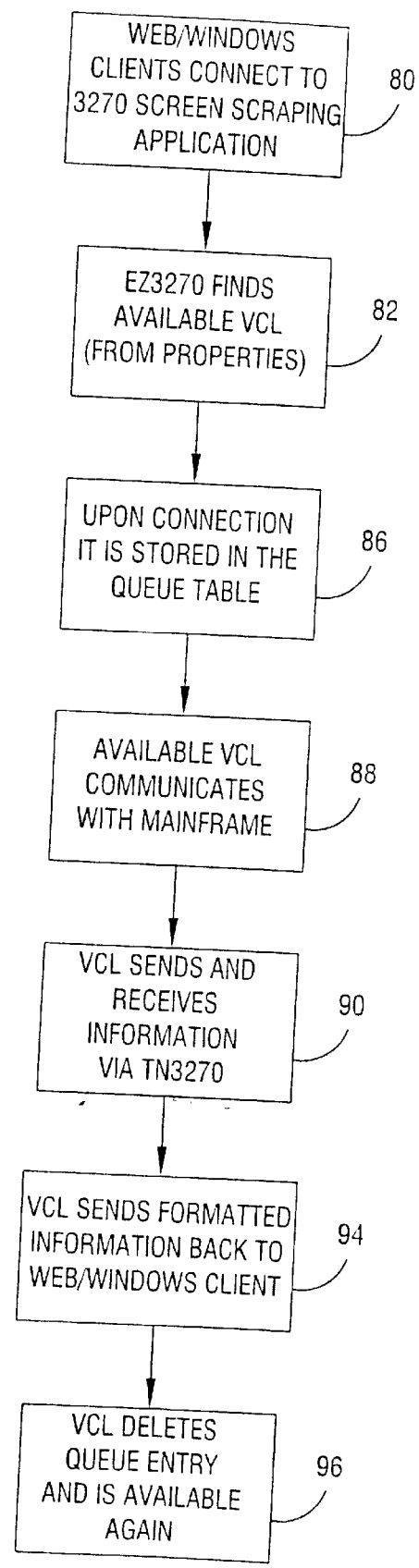
FIG. 3 is an exemplary flow diagram illustrating operation of the mainframe and remote computers of FIG. 1 for screen scraping.

In an alternative embodiment, FIG. 3 is a flow diagram illustrating features of an exemplary screen scraping and emulation function. Preferably, the screen scraping and emulation program is written in a visual component library (VCL) language. The program preferably provides communication through TN3270 TCP/IP protocols and retrieves information from the 3270 presentation of mainframe 22. According to the flow diagram of FIG. 3, web server 26 executes mainframe applications and delivers the information back to a web browser. Beginning at step 80, the client connects to the 3270 screen scraping application and, at step 82, the screen scraping program finds an available VCL component from properties. Proceeding to step 86, the VCL component handles security by storing access information in a database table, or queue table, for queuing and verification upon connection. This queue table constitutes a second database for monitoring the activity of each VCL and user access of the socket. As clients connect, the queue allows a client to find a free 3270 session. Security is maintained by stateless connections and a query of the database queue wherein each client interaction and password is time stamped and a password is asked for only if one has not been received within a table driven time. This type of system fits a stateless CGI model where the information requested does not require a session, only a response.

The available VCL component communicates with mainframe 22 at step 88 and, at step 90, the VCL component sends and receives information via the TN3270 session. In other words, once a session is available, the socket will extract the information that was previously defined specific to the request. The information is then tagged with the correct HTML and the formatted information is then sent by the VCL component back to the client at step 94 for further requests. Thus, system 20 turns the web browser into a stateless 3270 session by creating a 3270 connection on a web server and maintaining it for the life of the requesting HTML page. The VCL component then deletes the queue entry and becomes available again at step 96.

As described above, the screen scraping function of the present invention preferably uses VCL or Active X components. For example, the screen scraper program is nearly a one-to-one implementation of a C++ source code from the TN3270 emulator to a Pascal Visual Component Library or OCX Library. In this instance, the VCL/OCX is a component used in Rapid Application Development environments, such as the Borland Tool Set and Visual Basic (Delphi, C++). The screen scraper is preferably designed so that the data it extracts is specifically known and in an organized format as described in the IBM-3278-2 screen layout. After designing the definition of the layout, any number of VCL/OCX components can be dropped on the design environment and given the IP address and port of mainframe 22 for use in the socket.

Referring again to FIG. 1, the course auditing function of block 32 is preferably a Windows/Internet-based student advising system for performing the otherwise labor-intensive and costly tasks of advising students in planning and completing a program of study and auditing for graduation checks. System 20 provides easy access to data residing on mainframe 22 by an advisor (or student) via computer 24. Advisement staff can readily compare a student's existing or planned courses against the graduation requirements for a variety of programs. This function of system 20 permits rapid degree auditing and accurate advising and can be accessible to students, advisors and others from computer 24 or another computer connected to the Internet at any time of day. In this manner, system 20 analyzes the courses attempted by a student and determines eligibility for graduation. It serves both student and advisor by displaying the requirements that have yet to be satisfied in, for example, clear, easy-to-understand checkboxes. The advisor (or student) can then print the report in a familiar format or electronically mail it to the student.

In a preferred embodiment of the invention, the degree-auditing engine interacts with the advisor to record waivers and exceptions and to save them for future reference. With an Internet version of system 20, both students and advisors gain access to transcripts and degree audits. It is contemplated that any student with a web browser can view his or her own transcript and that advisors have the full functionality of a desktop system, subject to appropriate web-based security controls. In one embodiment, system 20 achieves security through an encryption cipher and secure sockets layer so data remains secure and transactions are seamless. Users log on by entering, for example, an institution ID number and password.

According to the invention, system 20 maps a student's courses as objects. For example, different courses each correspond to a universal transfer equivalency course (UTEC), which is a mapped object form of the course. By using UTEC's, system 20 is able to efficiently deal with one of the most time consuming problems in advising, namely, determining credit for transfer courses. Many courses offered by different universities and colleges contain the same general content but have different names and/or alphanumeric catalog listings. A UTEC table, however, contains all the courses available to a major in their various forms and names and provides a single "mapping" course for easy conversion from one institution to another. As a new course is evaluated, it is permanently associated with a UTEC and every subsequent evaluation of this course is accomplished automatically with regard to the associated UTEC. The UTEC is a permanent fixture and maps all equivalencies to one course, allowing the audit engine to check only one course name even though the course may actually have several distinct names. A programmer preferably builds the college major requirements using a friendly graphical user interface that includes various boolean expressions to either exclude or include the object courses. System 20 totals the sums of the boolean expressions individually and comprehensively resulting in a response of "is met" or "is not met".

In FIG. 1, the database 30 of mainframe 22 comprises a relational database that can be accessed through a standard such as open database connectivity. Those skilled in the art recognize that a relational database organizes data, and the relations between the data, in tables. In this instance, the data and rules regarding the courses are embedded into the system's tables to reduce or eliminate maintenance and custom coding. The rules may be changed while system 20 is in operation to generally obviate changes in source code. In other words, a user can modify or add requirements without recompiling in a dynamically designed environment. In general, the course auditing program of block 32 analyzes an inventory list of items. The program then compares the list of items with a "rules" list, such as for academic auditing, to determine if there are items missing or contained and, if contained, whether the items meet the requirements of the rules. For example, upon entering an academic program, students are required to take a specific set of courses in a major to complete a degree. A degree in the particular major may require a stringent set of courses or some variation of required courses. These requirements must be compared with the courses that the student has already taken. The course auditing program of the present invention performs this comparison function.

The user accesses the relational database 30 via computer 24 where it caches the data locally, evaluates it and then sends the entire contents to the web server 26 for mediating between the auditing application program and the network. In this embodiment, server 26 functions as a middleware broker between mainframe 22 and personal computer 24. Once relational database 30 is established, a "data warehouse" or "data mart" can be created at server 26. Since the information is gathered in one central location, system 20 can easily distribute or replicate the information to various locations for quicker access and customization without corrupting the original record. This provides the benefit of a data-driven document management system with access security and where all documents are kept in database 30. In the illustrated embodiment, system 20 comprises a pseudo three-tier model, having a first tier at computer 24, a second tier at the middleware server 26 and a third tier at mainframe 22.

Figure 4:
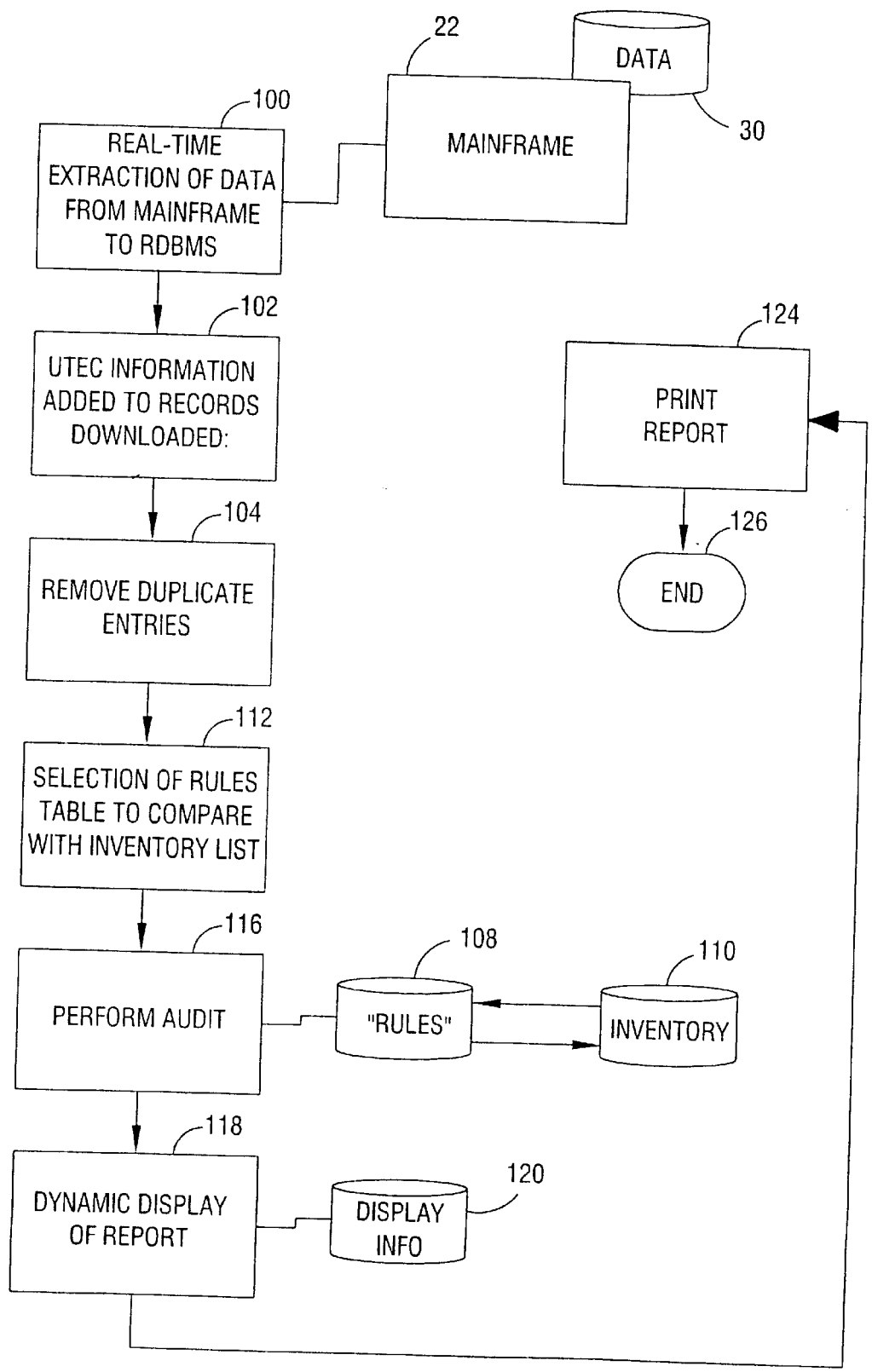
FIG. 4 is an exemplary flow diagram illustrating operation of the mainframe and remote computers of FIG. 1 for extracting data to generate a course audit report.

FIG. 4 illustrates process flow according to a preferred course auditing function. Beginning at step 100, the program extracts data from mainframe 22 to the relational database system 30 (e.g., Oracle, MS-SQL, Informix, DB/2 or Sybase) for evaluating and reporting on the audit. In one embodiment, programmatic algorithms perform the conversion/extraction of data and the CICS sockets and/or screen scraping functions of the present invention are used to complete the data connection. System 20 also adds UTEC information to the downloaded records at step 102 and removes duplicate entries at step 104. Once this process is completed, system 20 can evaluate the courses one at a time against the major requirements.

As described above, the course auditing program performs a matching algorithm using the relational database procedure. Database 30 preferably includes both a data table 108 and an inventory list 110. In this instance, the course audit program creates a dynamic matching, single-iteration algorithm by comparing rules embedded in the data table 108 (e.g., up to 20 per record) to the inventory list 110. Preferably, system 20 selects rules table 108 for comparison to the UTEC inventory list 110. For example, the rules list includes a set of required courses and the associated rules for these courses. In addition, the rules lists provides a translation course, namely, the UTEC, for each of the courses. The UTEC provides a baseline for all course credits that are to be transferred from another school.

Proceeding to step 116, system 20 performs the audit (i.e., executes the matching algorithm). In this embodiment of the invention, the program matches object courses with object requirements and tests the boolean expressions for each requirement. This is accomplished through the preliminary UTEC evaluation in which exact courses inherit UTEC properties for use in the graduation audit.

After performing the audit, system 20 proceeds to step 118 for displaying a report of the audit results. Since the report is dynamic, system 20 can change it while in use and in production without compiling the application. The report uses table driven data 120 concerning, for example, font, style, data, point size and location for displaying the information on a standard output (i.e., the monitor of computer 24). In a manner similar to a 3270 interface, the application gets the information from the database rather than in the data stream. For this reason, the application can easily be changed "on-the-fly." As shown in FIG. 4, system 20 prints the dynamic report at step 124 and then ends the program at step 126.

Although the presentation of the information is similar in nature to the delivery of a 3270 emulation, the data is not sent to the client screen for processing. Rather, the information is read from the same major table. Objects are created dynamically and using Polymorphism, Encapsulation, and Inheritance, the objects inherit the properties, events and methods of an originally hard-coded object. Thus, the presentation is controlled remotely and offers a central location for code and report changes while offering client/server modeling.

Using the common object model/common object request broker architecture model known to those skilled in the art, the interface and the rules are separated, allowing web server 26 to call the procedure as if it were just an object. This gives the freedom to maintain one set of code and offer it to either a web or Windows front.

In one preferred embodiment of the invention, the course auditing function illustrated in block 32 includes several software components, such as Transfer Evaluations, Course Equivalencies, Major/Minor Checking/Clearing, Graduation Checking/Clearing, True Type Reporting, QuickView Transcript, Requirements Generator, Querying and Reporting, and Demand Analysis. The following describes characteristics of the exemplary software components of the auditing program:

Transfer Evaluations: The program includes an interactive Transfer Evaluations package that can be accessed by any authorized user of system 20. This package allows the institution to build transcripts into a database through drop down list boxes, radio buttons and checkboxes with a minimal amount of data being typed by the user.

Course Equivalencies: In a manner similar to Transfer Evaluations, the program includes an interactive menu system permitting the user to make one course equivalent to another and, thus, inherit all its properties. Users can override any course in the transcript and make changes with a click of the mouse. The user can decide not to make any equivalencies but change the course properties. This can be permanent for all students or just a one-time exception for a single student.

Major/Minor Checking/Clearing: Individual departments often have complete control over their students and their degree requirements. This interactive system allows the department to perform on-the-fly major checks, exceptions, waivers and drag-and-drop substitutions. As such, this component provides an electronic paper trail.

Graduation Checking/Clearing: The summation of course audit is a graduation check or clearance. This interactive system displays all the requirements met and unmet in check boxes and short descriptions as a final process before printing the report.

True Type Reporting: The final product of the entire process is the printed report. This component permits customization of the report's appearance.

QuickView Transcript: This component permits a transcript to be viewed and, if desired, modified from a spreadsheet format.

Requirements Generator: The program includes an interactive process for building the rules for graduation into the database. This component selects a course for the requirement and then selects the boolean expressions and properties that the course must match. For group requirements, such as a minimum number of hours, the component creates a name for the requirement and then selects the boolean expressions and properties for the requirement.

Querying and Reporting: Using this component, any authorized user can quickly create reports or queries to answer questions such as "I would like to see all students who have had an F in the last two semesters with a G.P.A. greater than 3.0." This gives administrators and advisors the opportunity to seek out specific students. Other queries may include Dean's lists, graduation lists, problem letters and the like.

Demand Analysis: After all students have been checked for missing requirements, this component permits a query to be entered for analyzing what courses students are going to need in the future. This offers demand analysis prior to registration. For example, a department may wish to add sections of a course prior to registration if more than a certain number of students need the particular course to graduate.

Although the present invention is described herein with respect to student-related data, it is to be understood that aspects of the invention are applicable for providing on-line access to mainframe databases used in a wide variety of businesses and institutions. Further, the present system may be implemented locally on a network without connection to the Internet.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A data management system comprising:
   a web server for accessing sites on a global network;
   a remote computer connected to the global network via the web server, said remote computer communicating on the global network using a client-server communications protocol;
   a database storing data; and
   a mainframe computer associated with the database, said mainframe being operable to execute customer information control system (CICS) transactions, said CICS transactions controlling an application program for processing the data stored in the database, said mainframe receiving and responsive to an open socket command from the remote computer via the web server for enabling CICS sockets, said CICS sockets permitting the remote computer to communicate with the mainframe by the client-server communications protocol so that the CICS transactions are executable by the remote computer for controlling the application program at the mainframe.

2. The system of claim 1 wherein the mainframe comprises a host server and the remote computer comprises a client, said host server and client being connected via the web server.

3. The system of claim 2 wherein the mainframe includes a processor executing routines in response to the open socket command for:
   creating a host server socket at the mainframe, said server socket defining a virtual connection between the host server and the client; and
   passing information requested by the client from the host server to the client through the virtual connection.

4. The system of claim 3 wherein the web server executes routines for creating a client socket at the remote computer corresponding to the server socket at the mainframe, said client socket opening a communication channel to the server socket for connecting the client and the host server, and wherein the client sends parameters to the host server via the communication channel requesting the application program.

5. The system of claim 4 wherein the server socket parses the parameters sent to the host server by the client and causes the host server to execute the application program in response to the parameters sent from the client.

6. The system of claim 1 wherein the mainframe includes a processor executing routines in response to the open socket command for creating a server socket at the mainframe to connect the remote computer to the mainframe and wherein the mainframe sends processed data through the server socket to the remote computer.

7. The system of claim 6 wherein the mainframe formats the processed data to hypertext markup language before sending formatted processed data to the remote computer.

8. The system of claim 1 wherein the client-server communications protocol comprises a transmission control protocol/Internet protocol.

9. The system of claim 1 wherein the client-server communications protocol includes a hypertext transfer protocol for exchanging documents on the global network.

10. The system of claim 1 wherein the CICS transactions executed by the mainframe define a terminal session at the mainframe and wherein the remote computer executes a hypertext markup language (HTML) version of the terminal session at the remote computer.

11. The system of claim 10 wherein the remote computer accesses the data stored in the database as an HTML document.

12. The system of claim 10 wherein the terminal session comprises a 3270 session executed by the mainframe.

13. The system of claim 1 wherein the mainframe is responsive to a request from the remote computer following the open socket command for executing a report based on the stored data and delivering the report to the remote computer via the global network.

14. The system of claim 1 wherein the data stored in the database comprises academic registration data.

15. The system of claim 14 wherein the application program includes a routine for extracting selected academic registration data from the database for evaluating and reporting a course audit.

16. The system of claim 14 wherein the academic registration data includes an inventory of courses completed by one or more students and wherein the remote computer includes a processor executing an auditing program for:
   defining a rules list, said rules list including information representative of required courses and prerequisites for courses in an academic degree program;
   mapping the courses of a selected student as objects and comparing the mapped course objects; and
   comparing the mapped course objects to the rules lists to generate an audit report.

17. The system of claim 16 wherein the database comprises a relational database including the inventory of courses and the rules lists and defining a relationship therebetween.

18. The system of claim 16 wherein the mapped course object comprises a universal transfer equivalency course for comparing credits for courses taken at different academic institutions.

19. A method of managing data stored in a database associated with a mainframe computer, said mainframe being operable to execute customer information control system (CICS) transactions, said CICS transactions controlling an application program for processing the data stored in the database, said method comprising the steps of:
   generating an open socket command with a remote computer, said remote computer being connected to a global network via a web server for accessing sites on the global network, said remote computer communicating on the global network using a client-server communications protocol;
   receiving the open socket command from the remote computer at the mainframe via the web server, said mainframe and remote computer being connected via the web server;
   enabling CICS sockets in response to the open socket command from the remote computer, said CICS sockets permitting the remote computer to communicate with the mainframe by the client-server communications protocol; and
   executing the CICS transactions by the remote computer for controlling the application program at the mainframe.

20. The method of claim 19 wherein the mainframe comprises a host server and the remote computer comprises a client, said host server and client being connected via the web server.

21. The method of claim 20 wherein the step of enabling the CICS sockets comprises the steps of:
creating a host server socket at the mainframe in response to the open socket command, said server socket defining a virtual connection between the host server and the client; and
passing information requested by the client from the host server to the client through the virtual connection.

22. The method of claim 21 wherein the step of enabling the CICS sockets further comprises the steps of:
creating a client socket at the remote computer corresponding to the server socket at the mainframe;
opening a communication channel to the server socket with the client socket for connecting the client and the host server; and
sending parameters requesting the application program from the client to the host server via the communication channel.

23. The method of claim 22 wherein the step of enabling the CICS sockets further comprises the step of parsing the parameters sent to the host server by the client and causing the host server to execute the application program in response to the parameters sent from the client.

24. The method of claim 19 wherein the step of enabling the CICS sockets comprises the steps of:
creating a server socket at the mainframe in response to the open socket command for connecting the remote computer to the mainframe; and
sending processed data from the mainframe to the remote computer through the server socket.

25. The method of claim 24 further comprising the step of formatting the processed data to hypertext markup language before sending formatted processed data to the remote computer.

26. The method of claim 19 wherein the client-server communications protocol comprises a transmission control protocol/Internet protocol.

27. The method of claim 19 wherein the client-server communications protocol includes a hypertext transfer protocol for exchanging documents on the global network.

28. The method of claim 19 wherein the CICS transactions executed by the mainframe define a terminal session at the mainframe and further comprising the step of executing a hypertext markup language (HTML) version of the terminal session at the remote computer.

29. The method of claim 28 wherein the step of executing an HTML version at the remote computer includes accessing the data stored in the database as an HTML document.

30. The method of claim 28 wherein the terminal session comprises a 3270 session executed by the mainframe.

31. The method of claim 19 further comprising the steps of executing a report based on the stored data from the mainframe in response to a request from the remote computer following the open socket command and delivering the report to the remote computer via the global network.

32. The method of claim 19 wherein the data stored in the database comprises academic registration data.

33. The method of claim 32 further comprising the step of extracting selected academic registration data from the database for evaluating and reporting a course audit.

34. The method of claim 32 wherein the academic registration data includes an inventory of courses completed by one or more students and further comprising the steps of:

defining a rules list, said rules list including information representative of required courses and prerequisites for courses in an academic degree program;
mapping the courses of a selected student as objects and comparing the mapped course objects; and
comparing the mapped course objects to the rules lists to generate an audit report.

35. The method of claim 34 wherein the database comprises a relational database including the inventory of courses and the rules lists and defining a relationship therebetween.

36. The method of claim 34 wherein the mapped course object comprises a universal transfer equivalency course for comparing credits for courses taken at different academic institutions.

37. A method of extracting selected academic registration data stored in a database associated with a mainframe computer, said academic registration data including an inventory of courses completed by one or more students, said method comprising the steps of:
generating an open socket command with a remote computer, said remote computer being connected to a global network via a web server for accessing sites on the global network;
receiving the open socket command from the remote computer at the mainframe via the web server
connecting the mainframe and remote computer via the web server in response to the open socket command;
defining a rules list, said rules list including information representative of required courses and prerequisites for courses in an academic degree program;
mapping the courses of a selected student as objects;
comparing the mapped course objects to the rules lists; and
generating an audit report based on the comparison.

38. A method of extracting selected data stored in a database associated with a mainframe computer, said data including an inventory of items for use in a clearinghouse environment, said method comprising the steps of:
generating an open socket command with a remote computer, said remote computer being connected to a global network via a web server for accessing sites on the global network;
receiving the open socket command from the remote computer at the mainframe via the web server
connecting the mainframe and remote computer via the web server in response to the open socket command;
defining a rules list, said rules list including information representative of required items and prerequisites for completion in the clearinghouse environment;
mapping selected items as objects;
comparing the mapped objects to the rules lists; and
generating an audit report based on the comparison.

39. The method of claim 38 wherein the data comprises academic registration data and the items in the inventory comprise courses completed by one or more students.

40. The method of claim 39 wherein the mapping step includes mapping the courses of a selected student as objects.

* * * * *